UNITED STATES PATENT OFFICE.

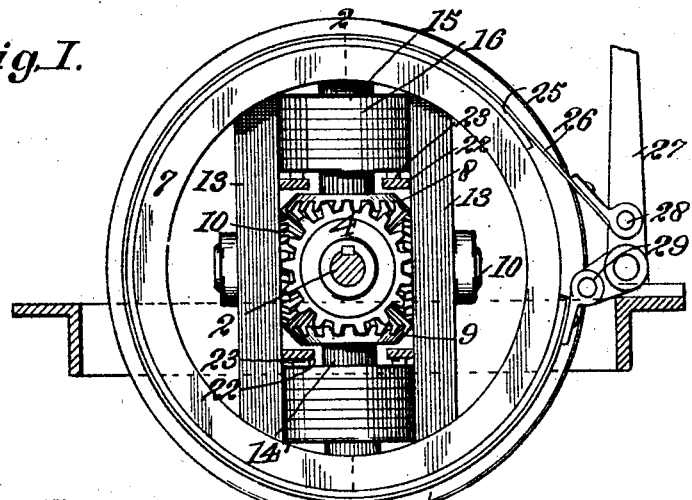
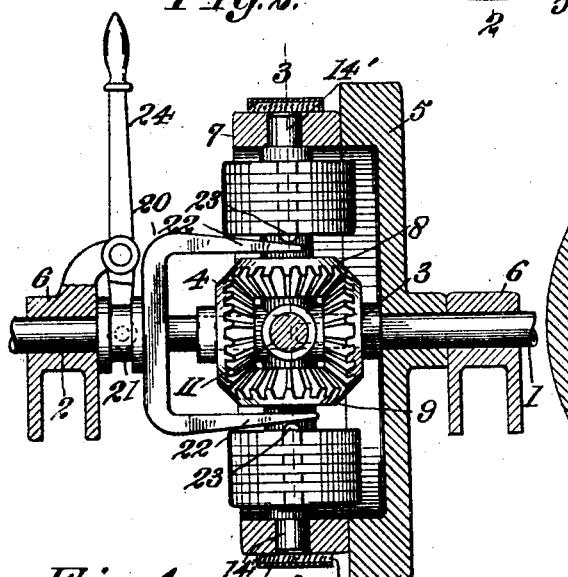

HUGH J. JONES, OF OCEAN PARK, CALIFORNIA, ASSIGNOR OF ONE-HALF TO ERNEST C. SOPER, OF SANTA MONICA, CALIFORNIA.

COMBINED CLUTCH AND TRANSMISSION MECHANISM.

1,409,864. Specification of Letters Patent. Patented Mar. 14, 1922.

Application filed October 18, 1920. Serial No. 417,622.

*To all whom it may concern:*

Be it known that I, HUGH J. JONES, a citizen of the United States, residing at Ocean Park, in the county of Los Angeles and State of California, have invented new and useful Improvements in Combined Clutch and Transmission Mechanism, of which the following is a specification.

This invention relates to improvements in clutch and transmission mechanisms particularly for motor vehicles and resides in the provision of simply and inexpensively constructed mechanism in which the functions of both clutch and transmission mechanism can be obtained in the one unitary mechanism.

One object of this invention is the provision of clutch mechanism which operates and is constructed on a novel differential gearing principle, reliable and certain in operation, not likely to get out of order, and capable of more easily definitely controlling the speed and operation of a driven shaft or member.

Other objects and advantages of the invention will be apparent during the course of the following description:

The invention consists of other objects and features some of which with the foregoing will be set forth at length in the following description wherein I shall outline that form of invention which I have selected for illustration in the drawings accompanying and forming a part of the present invention. In said drawings I have shown one form of the construction of my invention, but it is to be understood that I do not limit myself to such form, since the invention as expressed in the claims may be embodied in a plurality of forms.

In the accompanying drawings forming a part of this specification and in which like numerals are employed to designate like parts throughout the same, Figure 1 is a front elevation of the mechanism of my invention, Figure 2 is a vertical sectional view taken on the line 2—2 of Figure 1, Figure 3 is a sectional view taken at a right angle to Figure 2 on the line 3—3 of Figure 2, and Figure 4 is an enlarged sectional view taken on the line 4—4 of Figure 3.

The general and practical embodiment of the invention comprises a single differential system including two master gears, one on the engine or power shaft, and the other on the driven shaft, there being two or more planetary gears meshing with the master gears and mounted in the frame which permits said gears to revolve around the master gears.

Each planetary gear is controlled by a clutch brake which when locked holds said gears against rotation on their axis and causes the entire unit to revolve whereby the power and driven shafts rotate at the same speed. By releasing the brake, the planetary gears will revolve freely and have planetary movement around the master gears so that the power shaft rotates freely. Thus the clutching and de-clutching action is provided. The frame for the planetary gears serves as a brake drum and has suitably controlled brake bands thereon, whereby when the frame is held against movement the planetary gears cause a reverse action and the driven shaft reverses the direction of rotation.

The speed of the driven shaft can be controlled by the planetary gear brake mechanism.

In the accompanying drawings wherein for the purpose of illustration is shown a preferred embodiment of my invention, the invention comprises a power shaft 1 and a driven shaft 2 which have beveled master gears 3 and 4 fixed thereto. A fly wheel 5 is fixed to the power shaft and both shafts are suitably supported in bearings 6. Mounted in an annular frame 7 which surrounds the master gears are planetary gears 8 and 9, both of which mesh with said master gears. There may be provided idler planetary gears 10 on shafts 11 carried by cross pieces 13 on the frame 7, said gears 10 also meshing with the master gears.

The gears 8 and 9 are fixed to rotary tubular shafts 14, which shafts are suitably journaled on axles 14' fixed to the frame 7 and a loose collar 14" on the shafts 1 and 2.

As a means for controlling the planetary action of the gears 8 and 9 so as to effect the clutching and de-clutching action I provide clutch brakes for the said gears, each brake comprising discs 15 fixed to shaft 14, and discs 16 carried by the cross pieces 13 and overlying the discs 15. The discs 16 have tongues 17 which engage in slots 18 in said cross pieces 13 so as to hold said discs against rotating but permit radial or outward bodily movement thereof whereby the discs may be forced to frictionally engage one another and lock. Leaf springs 19 resist this movement of the discs and retain and normally hold said discs out of locking or de-clutching position.

A U shaped operating member 20 is attached to a circumferentially grooved collar 21 in the driven shaft 2 and is provided with bifurcated arms 22 which are wedge shaped and embrace the gears 8 and 9. The wedge shape arms slidably engage lugs 23 on the innermost discs 16. The collar is operated by a suitable lever 24 and when moved inwardly causes the wedge shaped arms 22 to engage and force the lugs 23 outwardly. This presses the discs 16 into close engagement with the discs 15 and said discs lock in order to prevent rotation of the shafts 14 and gears 8 and 9.

The frame 7 serves as a brake drum and has a brake band 25 thereon. A brake band 26 surrounds the band 25 and is contracted and expanded by a lever 27 with which said band 26 is operatively connected at 28 and 29.

In the operation of the mechanism, the power shaft normally turns free of the driven shaft since the clutch brakes for the gears 8 and 9 are normally released and said gears have planetary movement around the master gears.

To enclutch the shafts 1 and 2, the operator rocks the lever 24 and pushes the arms 22 inwardly so that the wedge portions of said arms move about the lugs 23. This forces the disks 15 and 16 together, locks them and prevents planetary movement of the gears 8 and 9. The entire mechanism now turns and the driven shaft is driven at the same speed as the power shaft.

To de-clutch the shafts, the lever 24 is moved so as to withdraw the arms 22, and the disks 15 and 16 are released or unlocked whereby the gears 8 and 9 are free to have planetary movement and the shaft 1 rotates free of the shaft 2.

Thus it will be seen that the speed of the driven shaft may be readily controlled by the clutch brake.

To reverse the shaft 2 the band 26 is tightened on the band 25 by properly manipulating the lever 27 and frame 7 is held against rotation, but the gears 8 and 9 are free to rotate on the shaft 14. The gears 8 and 9 therefore reverse the shaft 2.

With reference to the foregoing description and the accompanying drawings it will be seen that I have provided strong, durable, easily operated and reliable clutch mechanism in which "slipping of the clutch" is eliminated and an effective and positive control of a driven member may be obtained.

It is to be understood that the form of my invention herewith shown and described, is to be taken as a preferred example of the same, and that various changes in the shape, size and arrangement of parts may be resorted to without departing from the spirit of the invention or the scope of the subjoined claim.

Having thus described my invention, I claim:—

Clutch and transmission mechanism embodying in its construction, a power shaft, a driven shaft, master gears fixed to said shaft, a rotary frame surrounding said shafts, shafts rotatably carried by said frame, planetary gears fixed to said shafts and meshing with said master gears, cross pieces in said frame on opposite sides of said planetary gears and having radial slots formed therein, friction discs fixed to the last named shafts, friction discs overlapping the first named discs and being free of said last named shafts, tongues on said discs slidable in said slots, springs in said slots normally forcing said discs apart, and a wedge member movable into engagement with certain of said movable discs so as to force said discs together.

In testimony whereof I affix my signature.

HUGH J. JONES.